(No Model.)
R. T. STOKES.
COMBINED HOPPLE AND TAIL HOLDER.
No. 349,124. Patented Sept. 14, 1886.
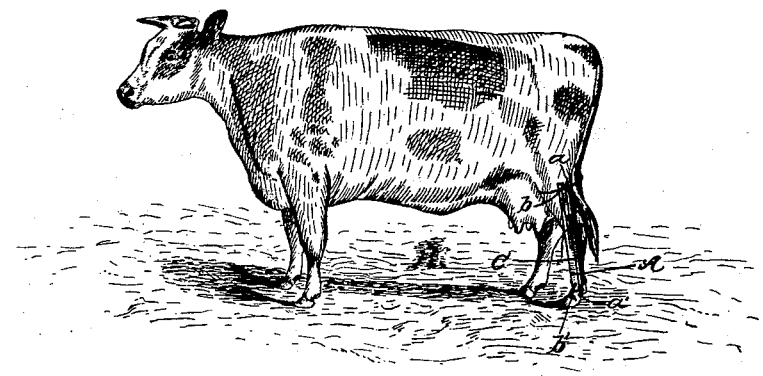
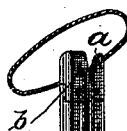
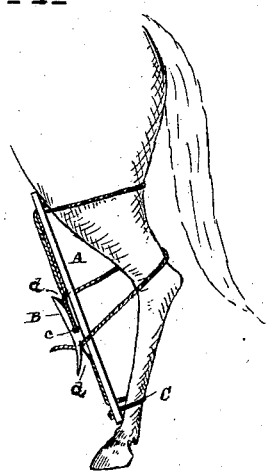
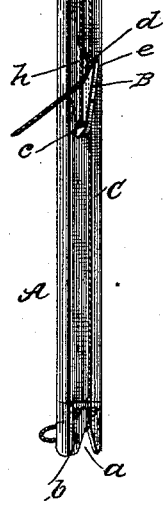
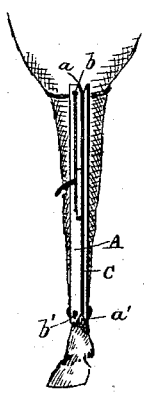
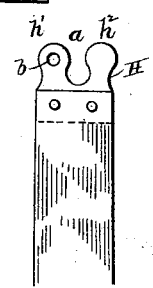
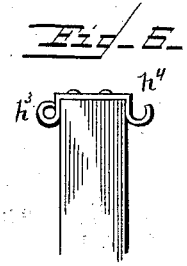
Witnesses
Edwin T. Yewell,
W. F. Huntemann
Inventor
Russell T. Stokes,
By his Attorney
W. A. Redmond

UNITED STATES PATENT OFFICE.

RUSSELL T. STOKES, OF GARNETT, KANSAS.

COMBINED HOPPLE AND TAIL-HOLDER.

SPECIFICATION forming part of Letters Patent No. 349,124, dated September 14, 1886.

Application filed June 24, 1886. Serial No. 206,085. (No model.)

*To all whom it may concern:*

Be it known that I, RUSSELL T. STOKES, a citizen of the United States, residing at Garnett, in the county of Anderson and State of Kansas, have invented certain new and useful Improvements in Combined Hopples and Tail-Holders; and I do hereby declare the following to be a full, clear, and exact description of the invention, such as will enable others skilled in the art to which it appertains to make and use the same.

This invention relates to devices for hoppling domestic animals, and it has for its object to provide a very simple, efficient, and durable device adapted to be applied either to the fore or hind leg of an animal, and also to secure the tail and leg together when required; and it consists of the parts and combinations of parts hereinafter described and claimed.

In the accompanying drawings, forming a part of this specification, Figure 1 is a view of my improved device applied to a cow to secure the tail and leg together; Fig. 2, a perspective view of the device; Fig. 3, a side view showing it applied to the foreleg of a horse; Fig. 4, an edge view showing a modified construction of the device applied to the hind leg of a horse; Fig. 5, a detail view of one of the cap-pieces, and Fig. 6 a modification of the cap-piece.

Similar letters refer to similar parts throughout the several views.

A represents an iron or wooden bar of sufficient length to reach from the pastern-joint to the thigh of the animal to which it is to be applied. If made of wood, and I prefer this material, it should be shod or fitted at each end with the iron cap-piece H, (shown in Fig. 5,) for the sake of securing greater durability, although I may form the slots and perforations directly in the wood itself, if desired. These caps are of malleable iron, preferably cast somewhat saddle-shaped, as represented in said figure—that is, with two smooth-rounded projecting knobs, $h'$ $h^2$, with a central hollowed out portion forming a hook or slot, $a$, between them at one end, and their other ends being reduced and inserted in slots in the ends of the bar, and there secured by rivets or in any other suitable manner. In the knobs $h'$ perforations $b$ are formed. The knobs are rounded off, so as to prevent them chafing the animal. While I prefer the above-described cap-piece, yet I have used with good result the modified construction shown in Fig. 6, which consists of the eye $h^3$ and hook $h^4$, formed in one piece, and having its central portion secured to the end of the bar by screws or nails, so that the hook and eye will be on opposite sides or edges of the bar. When the cap-pieces H are in position at the opposite ends of the bar A, the slots $a$ will be in line with each other.

B is a fastener or keeper, formed of iron or other suitable material, which is rigidly secured to bar A at about or slightly above its center or middle portion. A perforation, $c$, is formed in the keeper near its lower end, and a slot, $d$, which is cut diagonally or slantingly inward, is formed in its upper end, so as to leave a point, $e$, projecting outwardly beyond the inclined surface $h$ of said upper end to guide the rope C into the slot.

C is a rope, cord, or strap, one end of which is passed through lower perforation, $b$, in the end of the bar, and knotted or otherwise secured therein, so as to prevent it slipping out.

In Fig. 4 I show a modification of the keeper, whereby the rope or strap may be wound around the animal's leg three times instead of twice. In this view the keeper is perforated at its center, and V-shaped slots $d$ are formed at each end.

In applying my device to a cow I first place the holder against the outer side of the leg with its lower end at about the pastern-joint and then pass the cord, rope, or strap C around the leg, above or below the joint, and through the lower hook or slot $a$, thence up along the bar to the upper hook or slot $a$, and through the same and around the tail and thigh into upper perforation, $b$, thence downward to the keeper and through perforation $c$, and up along the keeper into slot $d$, where I jam it tightly, so as to hold it against any movement. In the modification, Fig. 4, the same operation is performed, and then the rope is passed around the leg at the hock and brought back to and jammed tightly in the lower slot, $d$. This construction of the device is intended to be used on animals that are vicious kickers. It will be noticed that I secure the tail and leg by the same cord, and that the cow can not bend the latter so as to bring it forward and kick the person milking, owing to the inflexibility of the holder and the fact that it is bound to the leg above and below the hock-joint, preventing the same being bent.

By means of this device a kicking-cow can be easily milked without any liability of the person milking being kicked or switched by the tail of the cow.

This device may be applied as shown in Figs. 3 and 4, to the fore leg and hind leg of a horse or mule, as well as to either leg of a cow, the only difference being in the position it is applied to effect different results—as, for instance, if it is desired to permit a horse to graze, and yet prevent him lying down or jumping a fence, the bar is secured by the rope or strap to the side of the fore leg; or if it is desired to prevent a horse pawing in his stall, a bar is secured to the rear or back part of both fore legs. This will also prevent him bucking and rearing. To prevent the horse kicking, the bar is secured in front of the hind leg. Thus it will be seen that my invention will prevent, according to how it is applied, a cow kicking or switching her tail while being milked, or prevent a horse or mule kicking, pawing, lying down, jumping a fence, bucking, or rearing.

Having thus described my invention, what I claim as new, and desire to secure by Letters Patent, is—

1. A combined hopple and tail-holder formed of an inflexible bar, perforated and slotted keeper B, perforated and slotted cap-pieces H, and a cord, rope, or strap, substantially as and for the purpose described.

2. The combination, in a combined hopple and tail-holder, of the bar A, the cap-pieces H, having the perforations $b$ and hooks or slots $a$, with the keeper B, having the slot $d$ and perforation $c$, and a suitable cord, rope, or strap, substantially as described.

3. A combined hopple and tail-holder, consisting of the inflexible bar A, the malleable-iron recessed cap-pieces H, having the hooks or slots $a$ and perforations $b$, the keeper B, rigidly secured to said bar, having the inclined upper surface, $h$, diagonal slot $d$, guide-point $e$, and perforation $c$, and a suitable cord, rope, or strap, C, all as and for the purpose set forth.

4. In a combined hopple and tail-holder, the combination of an inflexible bar having slotted and perforated cap-pieces, a keeper having slots and perforations, and a strap or cord, whereby the tail of an animal may be secured against its leg and the bending of the latter prevented, as set forth.

In testimony whereof I affix my signature in presence of two witnesses.

RUSSELL T. STOKES.

Witnesses:
J. C. MARSHALL,
A. D. SOWERBY.